United States Patent Office 3,286,398
Patented Nov. 22, 1966

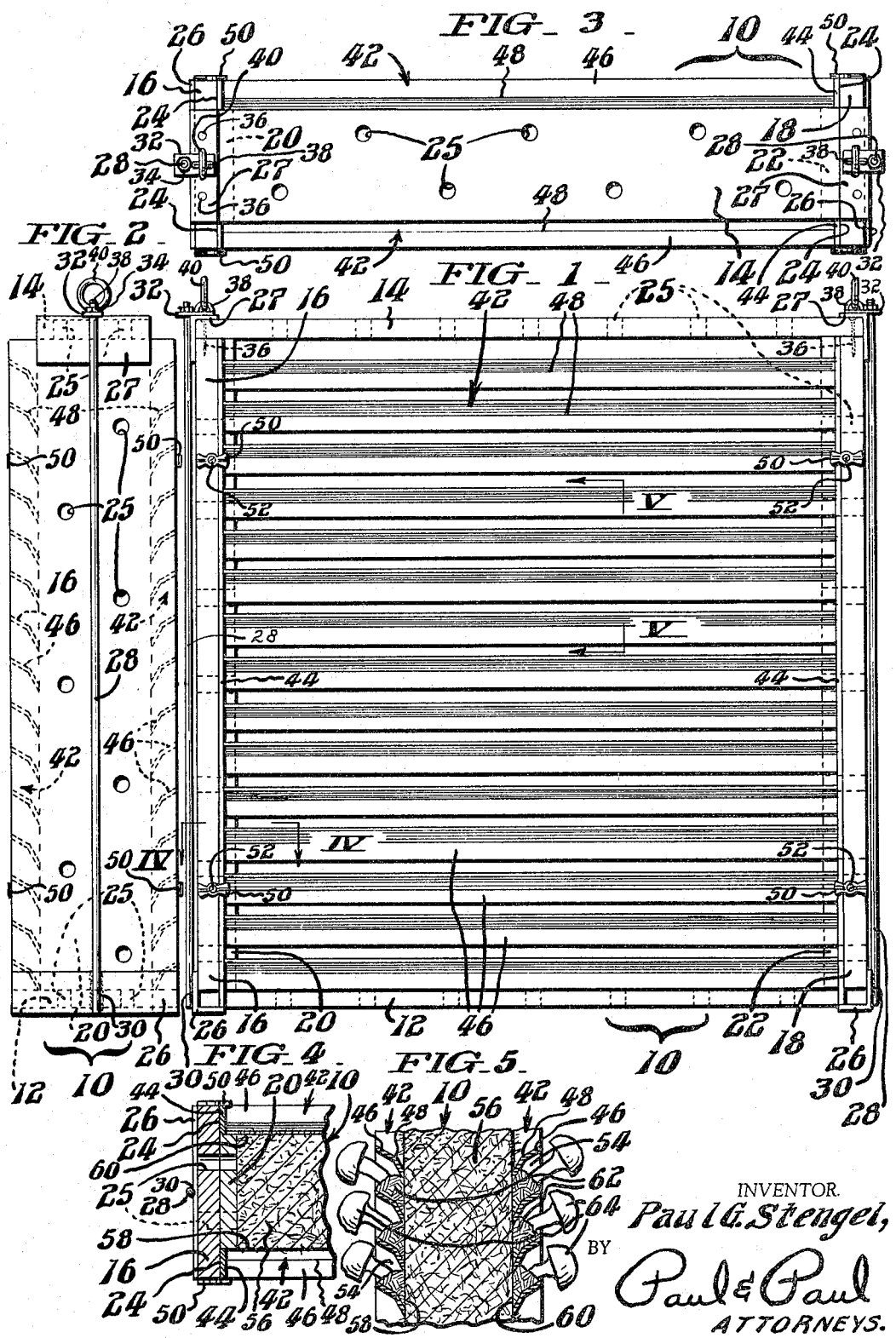

3,286,398
MUSHROOM CULTIVATION
Paul G. Stengel, R.D. 2, Kennett Square, Pa.
Filed Mar. 6, 1964, Ser. No. 349,905
5 Claims. (Cl. 47—1.1)

This invention relates generally to mushroom cultivation and particularly to improvements in methods and apparatus for growing mushrooms on a commercial basis.

In arranging facilities for successfully growing mushrooms on a commercial basis, it must be borne in mind that the yield of a crop depends in large part upon the bed area and the cropping period. The cropping period, which normally is approximately three months, may be prematurely terminated, as by disease. Therefore, to assure the greatest yield the largest possible bed area must be provided in the available space. In a building twenty feet wide and sixty feet long, for example, stationary shelves may be arranged in two rows with six shelves in each row to provide approximately four thousand square feet of bed area. By using a movable tray system, the bed area may be increased by approximately thirty percent. But even the tray system affords an unduly restricted bed area per unit of available space.

In arranging the facilities, it must also be borne in mind that the operation of picking the mushrooms should be facilitated. It is commonly necessary, particularly when the mushrooms are grown on stationary shelves, to bend over the beds to pick the mushrooms, but the necessity for doing so should be eliminated altogether if possible.

Accordingly, an important object of the invention is to provide improved methods and apparatus for cultivating mushrooms on a commercial basis.

Another object is to provide a frame, which, when loaded with mushroom compost and upended, provides bed areas respectively on the front and rear sides thereof, which bed areas may be spawned and thereafter covered with a layer of mushroom casing while the frame is in an upright position.

Another object is to provide a number of such frames capable of being arranged in a given available space in a manner which affords substantially increased bed area per unit of available space.

Another object is to provide such a frame which facilitates the manual picking of mushrooms by eliminating the necessity for bending over to do so, and which lends itself readily to the mechanical picking of mushrooms.

Another object is to provide such a frame which provides materially increased bed area per unit of compost volume.

Another object is to provide such a frame which lends itself readily to being handled by mechanical means, particularly during the loading and unloading thereof with mushroom compost and casing.

Other objects of the invention will become apparent when the following description is read with reference to the accompanying drawing, in which:

FIG. 1 is a front elevation of a mushroom frame constructed in accordance with the invention;

FIG. 2 is an end view of the frame shown in FIG. 1;

FIG. 3 is a top view of the frame shown in FIG. 1;

FIG. 4 is a section on line IV—IV in FIG. 1, showing the frame loaded with mushroom compost; and FIG. 5 is a section on line V—V in FIG. 1, showing the frame loaded with mushroom compost and casing and showing a "break" of mushrooms.

The following description is directed to the specific form of the invention illustrated in the drawing and is not addressed to the scope of the invention, which may be practiced in a variety of forms.

The exemplary mushroom frame illustrated in the drawing and constructed in accordance with the invention comprises a wooden frame 10 rectangular in shape. The frame is provided with horizontally extending bottom and top members respectively designated 12 and 14 and vertically extending opposite end members 16 and 18, the latter being lined respectively with members 20 and 22. The several frame members are suitably fitted and secured together to afford a rigid frame. The members 16 and 18 are substantially wider than the members 20 and 22 to provide a pair of vertically extending recesses 24 on each side of the frame. Vent holes 25 are provided all around the frame. At each of the lower corners of the frame is a corner bracket 26, and at each of the upper corners of the frame is a corner bracket 27. At each end of the frame is a tie rod 28 the lower end portion of which is welded to the associated corner bracket 26, as at 30, and the upper end portion of which extends freely through a plate 32. A nut 34 is threaded upon the upper end portion of the rod 28. The plate 32 is secured in position by welding to bracket 27 and by nails 36 extending through the underlying corner bracket 27. Welded to the top of the plate 32 is a staple 38 through which extends a ring 40. The frame may be hoisted by means of the rings 40.

On the front and the rear sides of the frame are grilles, generally designated 42. Each grille comprises a pair of vertically extending laterally spaced flat bars 44 and a series of horizontally extending laterally spaced parallel slats 46. The end of each slat is affixed to the associated bar 44, as by welding. Each slat may be provided with a longitudinally extending stiffening bend 48. In transverse section, each slat 46 is disposed at an angle of approximately forty-five degrees to the horizontal, being pitched upwardly and outwardly from the frame, as shown. The lower end portions of the bars 44 are seated upon the toes of the brackets 26. Pivoted to the members 16 and 18 of the frame are winged keeper elements 50 secured by screws 52.

In lieu of the unitary grilles 42, individual slats fitted into suitable grooves provided in the members 16 and 18 may be used. In this event, the slats may be removed and replaced individually, and, of course, there is no need for the winged keeper elements 50.

In the use of the apparatus, the frame 10 is unended, and the keepers 50 are turned to release the grilles 42. Then the grilles are removed. The frame 10 is then turned down and placed horizontally over a platen (not shown) to form an open top box-like assembly. The platen forms the bottom of the box, and the frame members form the upright sides of the box. The upper surface of the platen is flush with the plane coincident with the lower edges of members 12, 14, 20, and 22. Now the box may be loaded with suitably prepared mushroom compost, which is tamped down to a plane coincident with the upper edges of the members 12, 14, 20 and 22 to form a body of compost 56. Then a grille 42 is replaced over the upper surface of frame 10 and fastened in position by turning the winged keeper elements 50, whereupon the platen, frame 10, compost body 56 and grille 42 are turned over so that the grille 42, formerly on top, is now on the bottom. Then the platen is removed and replaced by the other grille 42, which is fastened in position by turning the winged keeper elements 50. The frame 10 may now be hoisted to upright position. It will be noted that the vertically extending exposed surfaces of the compost body 56, i.e., surface 58 in front and surface 60 in the rear, are held in place by the grilles 42, and that the slats 46 coact with the surfaces of the compost body 56 to form pockets or troughs 54 extending across the frame.

A period of pasteurization and then a cooling period are followed by planting of the surfaces 58 and 60 with grain or other spawn carrier. It takes from a week to ten days for the mycelium to grow through the mushroom compost. Then the troughs 54 are filled with mushroom "casing" 62 so as to cover the vertically extending surfaces 58 and 60 of the mushroom compost with about one inch of the casing 62.

Eventually, mushrooms, designated 64, grow through the casing 62 in rhythmic cycles called "breaks." They grow outwardly through the casing 62 and between the slats 46.

The contemplated size of the frame 10 is 48 inches wide by 12 inches from front to back by 60 inches high, which is an ideal size for handling by mechanical means, particularly when loading with compost and casing.

In a building twenty feet wide by sixty feet long, for example, the frames 10 may be arranged in seven rows, three feet center to center, with the frames in each row arranged in two tiers and with fourteen frames in each tier. This arrangement affords a bed area of approximately eight thousand five hundred square feet, which is a great deal more bed area than can be obtained in such a building by using stationary shelves and substantially more bed area than can be obtained in such a building by using a movable tray system.

Since bed areas are provided on both the front side and the rear side of the frame, only one-half the volume of compost normally used is necessary. In addition, it takes only a week to ten days for the mycelium to grow through the compost, whereas when mushrooms are grown by conventional methods, it takes from two to three weeks.

There is no necessity for bending over to pick mushrooms, and the frames are ideal for adaptation to mechanical picking.

What is claimed is:

1. In apparatus for commercially cultivating mushrooms, the combination comprising a pair of vertically spaced horizontally extending members and a pair of horizontally spaced upright members forming an upright open framework of a depth in the direction from front to back substantially equal to the depth of said members in said direction and of a height and width each in the order of several times the depth of said members in said direction, grille-like means covering the front of said framework, and grille-like means covering the back of said framework and spaced from the grille-like means covering the front of said framework a distance approximately equal to the depth of said members in said direction, said framework being adapted for being packed with mushroom compost and said grille-like means being adapted for coacting with said framework for confining the body of mushroom compost and for coacting with the underlying surfaces of the body of mushroom compost to form a series of horizontally extending vertically spaced troughs for holding mushroom casing piled against each of said surfaces to effectively cover the same.

2. The combination according to claim 1 wherein the clear spacing between the grille-like means covering the front of the framework and the grille-like means covering the back of the framework is in the order of eight inches.

3. The combination according to claim 1 wherein each grille-like means is in the form of a single unitary structure including a pair of horizontally spaced upright members and a series of vertically spaced horizontally extending slats spanning said upright members and, in transverse section, disposed at an angle to the horizontal, and, in the front and in the back of the framework, each of the upright frame members is provided with a longitudinally extending recess on the inner face thereof for removable receiving a marginal portion of the associated grille-like means.

4. The combination according to claim 1 wherein at least some of the frame members are provided with openings for venting the inside of the framework.

5. The combination according to claim 1 wherein means is provided at the top of the framework for removably suspending the same in an upright position from an overhead support.

References Cited by the Examiner

FOREIGN PATENTS 520,355 4/1940 Great Britain.
225,111 4/1943 Switzerland.

ABRAHAM G. STONE, *Primary Examiner.*

ANTONIO F. GUIDA, *Examiner.*

R. E. BAGWILL, *Assistant Examiner.*